Aug. 17, 1954 T. W. KAESTNER 2,686,489
METHOD OF REDUCING TUBE DIAMETERS
Filed Nov. 22, 1947
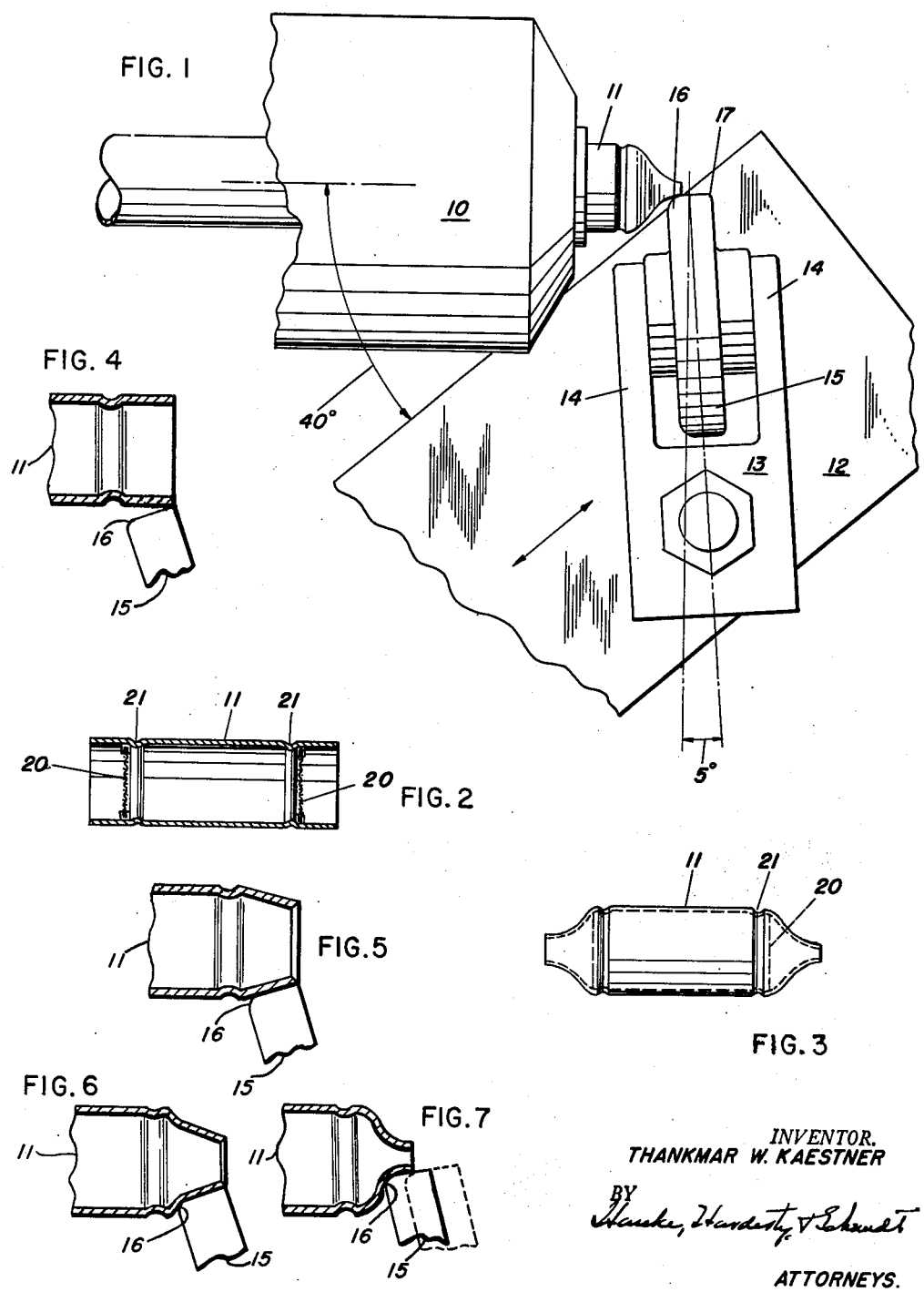
INVENTOR.
THANKMAR W. KAESTNER
BY
ATTORNEYS.

Patented Aug. 17, 1954

2,686,489

UNITED STATES PATENT OFFICE 2,686,489

METHOD OF REDUCING TUBE DIAMETERS

Thankmar W. Kaestner, Dearborn, Mich., assignor to Industrial Wire Cloth Products Corporation, Wayne, Mich., a corporation of Michigan Application November 22, 1947, Serial No. 787,581

1 Claim. (Cl. 113—52)

The present invention relates to a method of reducing tube diameters and more specifically to a method of carrying out such reduction so as to produce a conical transition from one diameter to a smaller one wherein the angle of the cone is rather abrupt, e. g., of the order of 40°, more or less.

The present method has been devised more particularly for the production of line filters for refrigeration machines but obviously may be used to produce other articles.

Such line filters usually consist of short lengths of tubing of larger diameter than the line of tubing into which they are to be connected and therefore there must be provided at their ends with closures to which the smaller line tubing may be connected.

Heretofore, such closures have usually been caps brazed to the filter tube and provided with small nipples to which the line tubing is secured by brazing or otherwise.

Instead of caps it has been proposed to reduce the diameter of the filter tube itself, after insertion of the filter material, but the methods proposed are open to objections.

Among the objects of the present invention is to provide a method of reducing the ends of such tubes quickly, easily and economically.

Another object is a method of carrying out such reduction without materially changing the wall thickness of the tube either in the transition portion or in the reduced diameter portion.

Still other objects will readily occur to those skilled in the art upon reference to the following description and the accompanying drawing in which:

Fig. 1 is a more or less diagrammatic representation in plan view of the active parts of a machine useful in carrying out the process.

Fig. 2 is a sectional view of a filter tube before subjecting it to the process.

Fig. 3 is a similar view of a finished tube.

Figures 4, 5, 6 and 7 show diagrammatically several positions of the tool and work.

In carrying out the process, a suitable tube is mounted for high-speed rotation about its longitudinal axis.

A convenient mounting is indicated in Fig. 1 as in a suitable chuck rotatable in a machine lathe (not shown). In this figure, the chuck 10 is shown as carrying the tube 11, this being shown at the completion of the operation.

Also carried by the lathe bed is a slidable holder 12 carrying a special tool consisting of a base 13, fixed to the holder 12 and having at one end ears 14 between which is a freely rotatable roller 15.

The periphery of roller 15 is cylindrical with curved edges 16 and 17, the edge 16 being curved on a relatively large radius.

As indicated in the drawing, the direction of movement of the holder 12 and tool 15, relative to the axis of tube 11, is at substantially the angle desired for the transition portion of the finished article. This angle may be varied somewhat, but is preferred to be about 40°. A few degrees more or less may be used.

Further, the axis of the tool 15 should also be at an angle to the tube axis rather than parallel. A satisfactory angle for this purpose has been found to be about 5°, though a degree or two more or less will operate satisfactorily.

In carrying out the method, the tube, as stated above, is rotated about its longitudinal axis at a very high rate. The tool 15 is then brought against the free end angularly as indicated.

The first contact of the tool with the tube will be the contact of the cylindrical portion of the tool with the extreme end of the unacted on tube. This produces a preliminary slightly conical reduction.

Further movement of the tool will then bring into play the rounded edge 16 and its higher unit pressure so that the actual desired reduction is carried out by this portion. When sufficient reduction has been produced, the tool may be moved in a direction parallel to the tube axis to prevent further reduction.

The operation as just described is illustrated in Figures 4, 5, 6 and 7. In these, Fig. 4 shows the first contact between the tube and tool; Fig. 5 shows the initial tapering; Fig. 6 shows the portion 16 of the tool moving the metal into its final position; while Fig. 7 shows the reduction completed and the final relative movement of the tool. These figures show how the process results in a reduced portion without any substantial thickening of the metal.

In carrying out the method, the tube wall remains of substantially the same thickness and is somewhat elongated. That is, the overall length is increased.

In the production of line filters, small metal screens 20 are positioned by beads 21 with suitable filter material (not shown) filling the interscreen space, before the tube ends are reduced.

Now having described the invention and the preferred method of practicing the same, it is to be understood that it is not to be limited to the specific details herein given but only by the claim which follows.

I claim:

The method of reducing the diameter of a tube which consists in revolving said tube at high speed about its longitudinal axis, applying pressure laterally to the end thereof to effect a preliminary reduction and at the same time tapering said tube at a small angle and then applying a higher unit pressure at the root of such taper to produce a taper of a much greater angle then moving the pressure applying means toward the end of the taper while maintaining such greater angle.

References Cited in the file of this patent

UNITED STATES PATENTS

| Number | Name | Date |
|---|---|---|
| 286,115 | Chaumont | Oct. 2, 1883 |
| 444,721 | Bevington | Jan. 13, 1891 |
| 1,836,921 | Harrison | Dec. 15, 1931 |
| 2,162,328 | Dewey | June 13, 1939 |
| 2,173,759 | McCloskey | Sept. 19, 1939 |
| 2,265,723 | Dewey | Dec. 9, 1941 |
| 2,284,210 | Johnson | May 26, 1942 |
| 2,449,942 | Johnson | Sept. 21, 1948 |

FOREIGN PATENTS

| Number | Country | Date |
|---|---|---|
| 577,311 | France | of 1924 |
| 61,897 | Sweden | of 1926 |

OTHER REFERENCES

Ser. No. 435,234, Biginelli (A. P. C.) published June 1, 1943.